United States Patent
Vecera et al.

(10) Patent No.: US 9,727,396 B2
(45) Date of Patent: Aug. 8, 2017

(54) MESSAGE QUEUE DEPLOYMENT

(75) Inventors: Martin Vecera, Brno (CZ); Pavel Macik, Brno (CZ)

(73) Assignee: Red Hat, Inc., Raleigh, NC (US)

( * ) Notice: Subject to any disclaimer, the term of this patent is extended or adjusted under 35 U.S.C. 154(b) by 506 days.

(21) Appl. No.: 12/956,787

(22) Filed: Nov. 30, 2010

(65) Prior Publication Data
US 2012/0136940 A1    May 31, 2012

(51) Int. Cl.
*G06F 15/16*    (2006.01)
*G06F 9/54*    (2006.01)

(52) U.S. Cl.
CPC ........ *G06F 9/546* (2013.01); *G06F 2209/547* (2013.01)

(58) Field of Classification Search
USPC .......................... 709/219, 224, 206; 370/352
See application file for complete search history.

(56) References Cited

U.S. PATENT DOCUMENTS

| | | | | |
|---|---|---|---|---|
| 6,978,367 B1 * | 12/2005 | Hind | ...................... | G06F 21/577 380/273 |
| 7,634,542 B1 * | 12/2009 | Krause et al. | ................ | 709/206 |
| 8,307,074 B1 * | 11/2012 | Martin | ................ | H04L 12/6418 709/206 |
| 8,331,351 B2 * | 12/2012 | Gilfix et al. | .................. | 370/352 |
| 2003/0023670 A1 * | 1/2003 | Walrath | .................. | H04L 29/06 709/203 |
| 2003/0093499 A1 * | 5/2003 | Messinger et al. | ........... | 709/219 |
| 2004/0024774 A1 * | 2/2004 | Jain | ................... | G06F 17/30289 |
| 2007/0027928 A1 * | 2/2007 | Majumdar | ............. | G06F 9/546 |
| 2011/0016186 A1 * | 1/2011 | Ismail | ..................... | H04L 29/06 709/206 |

OTHER PUBLICATIONS

"Java Message Service", accessed at http://en.wikipedia.org/wiki/Java_Message_Service on Oct. 28, 2010, last updated Oct. 18, 2010, 4 pages.

* cited by examiner

*Primary Examiner* — Kevin C Harper
*Assistant Examiner* — Derrick V Rose
(74) *Attorney, Agent, or Firm* — Lowenstein Sandler LLP (57) ABSTRACT

Some embodiments of a system and a method to automatically deploy message queues on-demand in a computing system have been presented. An application server may configure an application messaging service according to a set of rules in a configuration file. In response to applications requesting to access messaging queues for the first time, the application server may automatically deploy messaging queues on-demand following the set of rules in the configuration file.

15 Claims, 5 Drawing Sheets

MESSAGE QUEUE DEPLOYMENT

TECHNICAL FIELD

Embodiments of the present invention relate to messaging service in a computing system, and more specifically to management of message queues and topics of messaging service.

BACKGROUND

Conventionally, communication between applications in a computing system can be managed by messaging service, such as Java Messaging Service (JMS). Generally speaking, messaging service can route and/or deliver messages sent from one application (a.k.a. a producer application or a publisher) to another application (a.k.a. a consumer application or a subscriber). A message generally refers to an object containing data transferred between applications. An application generally refers to one or more sets of instructions, when executed by a processing device, causes the processing device to perform one or more tasks and/or functions.

JMS defines two options for a message exchange between applications, namely, message queues and topics. A message queue in general is a staging area that contains messages that have been sent and are waiting to be read. A topic in general is a distribution mechanism for publishing messages that are delivered to multiple subscribers.

For instance, when an application wants to use JMS, a corresponding message queue or topic has to be already deployed on an application server in the computing system. Preparing a JMS deployment is not a trivial matter, and it has to be performed by an application server administrator or be prepared in an application archive in advance.

BRIEF DESCRIPTION OF THE DRAWINGS

The present invention is illustrated by way of example, and not by way of limitation, in the figures of the accompanying drawings and in which.

DETAILED DESCRIPTION

Described herein are some embodiments of a method, an apparatus, and a system to automatically deploy message queues on-demand in a computing system. In one embodiment, an application server may configure an application messaging service according to a set of rules in a configuration file. In response to applications requesting to access messaging queues for the first time, the application server may automatically deploy messaging queues on-demand following the rules in the configuration file. Likewise, the application server may automatically deploy messaging topics on-demand following the rules in the configuration file. More details of some embodiments of how to automatically deploy message queues and/or topics on-demand in a computing system are described below.

Figure 1:
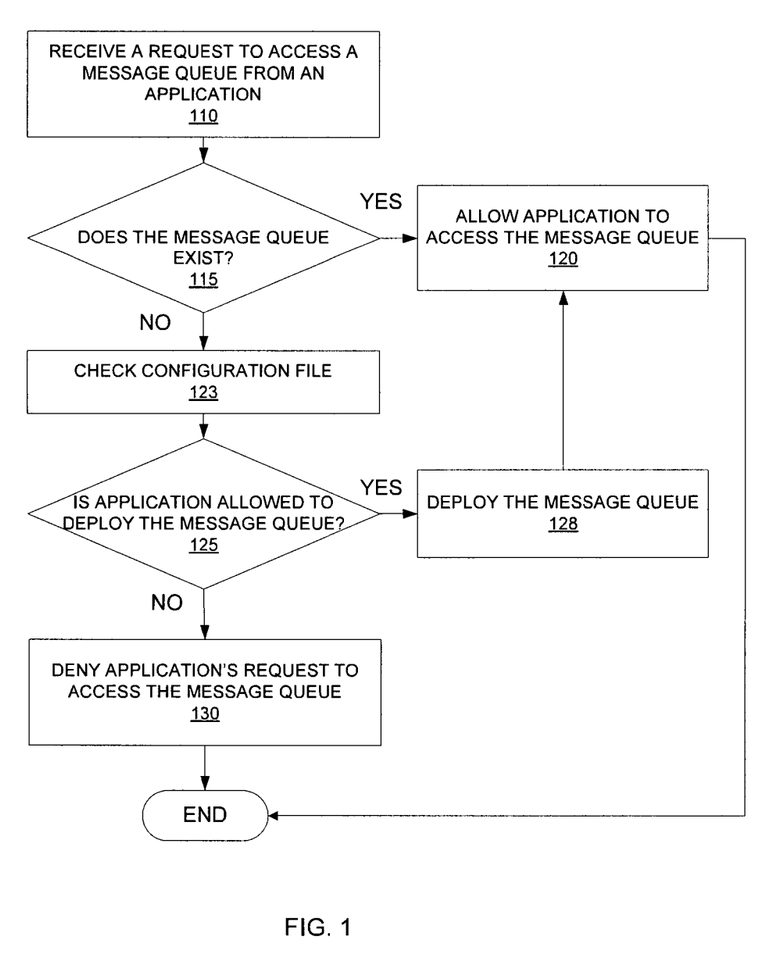
FIG. 1 illustrates a flow diagram of one embodiment of a method to automatically deploy message queues on-demand in a computing system.
Figure 3A:
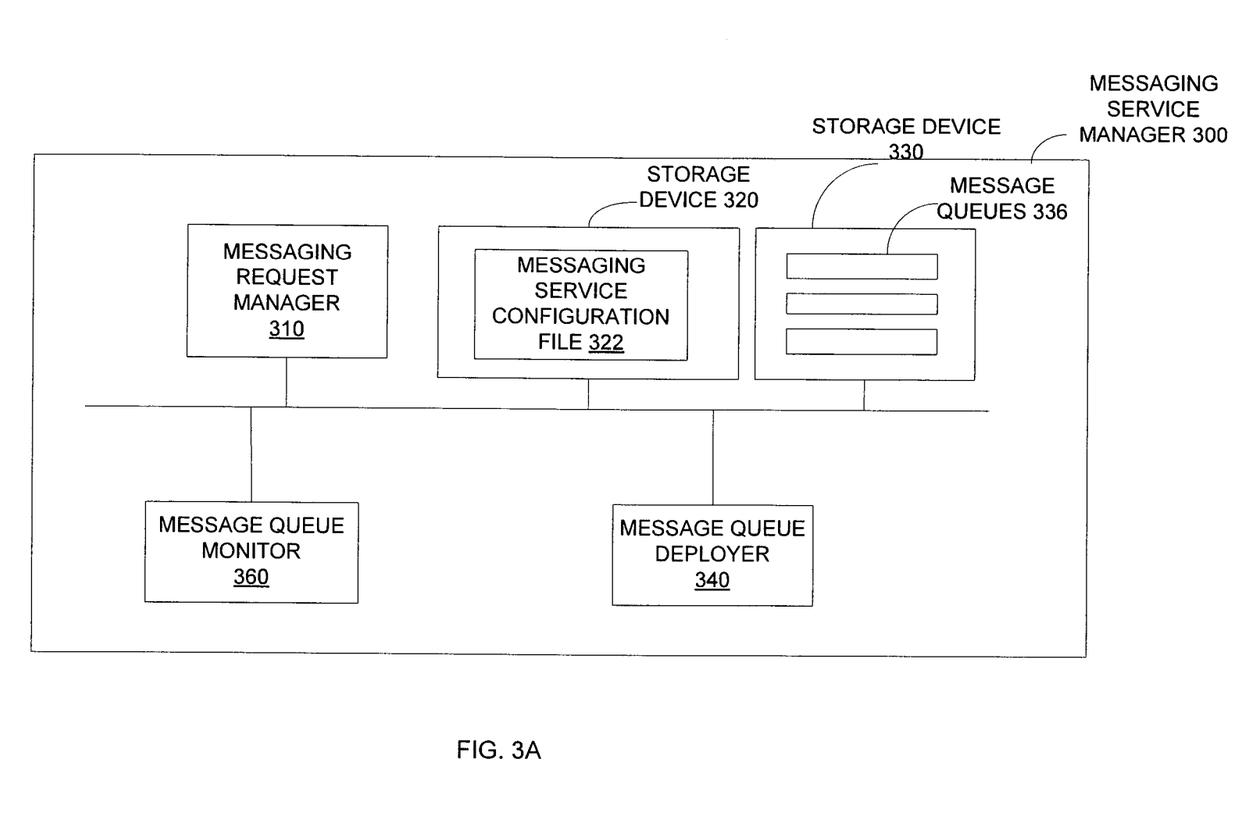
FIG. 3A illustrates one embodiment of a messaging service manager.

FIG. 1 illustrates a flow diagram of one embodiment of a method to automatically deploy message queues on-demand in a computing system. The method may be performed by processing logic that may comprise hardware (e.g., circuitry, dedicated logic, programmable logic, microcode, etc.), software (such as instructions run on a processing device), firmware, or a combination thereof. For instance, the messaging service manager 300 illustrated in FIG. 3 may perform at least part of the method in some embodiments.

In some embodiments, processing logic receives a request to access a message queue from an application (processing block 110). As mentioned above, a message queue in general is a staging area that contains messages that have been sent and are waiting to be read. First, processing logic checks if the message queue exists (processing block 115). If it exists, then processing logic allows the application to access the message queue (processing block 120) and then the method ends. Otherwise, if it does not exist, then processing logic transitions to block 123.

At block 123, processing logic checks a configuration file. In some embodiments, the configuration file contains a set of rules related to message queues and topics deployment and management. These rules may have been defined to protect security of the messaging system. For example, some rules may prohibit certain application(s) from deploying a particular message queue. Based on the rules in the configuration file, processing logic determines if the application is allowed to deploy the message queue requested (processing block 125).

If the application is allowed to deploy the message queue requested, then processing logic deploys the message queue (processing block 128) and then allows the application to access the message queue (processing block 120). The method then ends. Otherwise, if the application is not allowed to deploy the message queue requested, then processing logic denies the application's request to access the message queue (processing block 130) and then ends the method.

In some embodiments, the above technique is also applied to deployment of topics in the computing system. As mentioned above, a topic in application messaging service generally refers to a distribution mechanism for publishing messages that are delivered to multiple subscribers. When an application requests access to a topic, processing logic can first check if the topic exists, and if not, processing logic can check the rules in the configuration file to determine if the application is allowed to deploy the topic requested. If allowed, processing logic deploys the topic and then allows the requesting application to access the topic. On the other hand, if the application is not allowed to deploy the topic requested, then processing logic denies the request. Otherwise, if the topic already exists, then processing logic can simply grants access to the topic to the requesting application.

Figure 2:
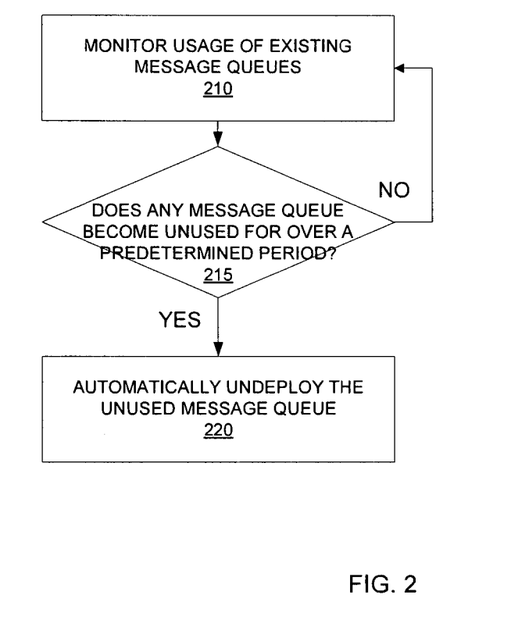
FIG. 2 illustrates a flow diagram of one embodiment of a method to automatically undeploy message queues in a computing system.

FIG. 2 illustrates a flow diagram of one embodiment of a method to automatically undeploy message queues in a computing system. The method may be performed by processing logic that may comprise hardware (e.g., circuitry, dedicated logic, programmable logic, microcode, etc.), software (such as instructions run on a processing device), firmware, or a combination thereof. For instance, the messaging service manager 300 illustrated in FIG. 3 may perform at least part of the method in some embodiments.

In some embodiments, processing logic monitors usage of existing message queues in a computing system (processing block 210). Processing logic checks if any message queue has become unused for over a predetermined period of time (processing block 220). If none, then processing logic returns to processing block 210 to continue monitoring existing message queues. Otherwise, processing logic automatically undeploys the unused message queue (processing block 220).

FIG. 3A illustrates one embodiment of a messaging service manager. The message service manager 300 includes a message request manager 310, a first storage device 320 storing a messaging service configuration file 322, a second storage device 330 storing a set of message queues 336, a message queue monitor 360, and a message queue deployer/undeployer 340, coupled to each other.

In general, the messaging service manager 300 manages application messaging service for a distributed computing system. The messaging service manager 300 can configure the application messaging service according to rules and/or parameters in the configuration file 322. The messaging service manager 300 includes the message request manager 310, which can receive requests from applications to access message queues, such as message queues 336. In response to receiving a request to access a message queue, the message request manager 310 may check if the message queue requested exists or not. If the message queue requested exists, then the message request manager 310 may grant the request. In some embodiments, the message request manager 310 may further check the rules in the configuration file 322 to ensure no rules will be violated before granting the request. Otherwise, if the message queue requested does not exist, then the message request manager 310 may check the rules in the configuration file 322 to determine if the requesting application is allowed to deploy the message queue requested. If so, then the message queue deployer/undeployer 340 may deploy the message queue requested for the requesting application, which is then granted permission to access the newly deployed message queue. The message queue deployed may be stored in the second storage device 330 with the other existing message queues 336. Otherwise, if the requesting application is not allowed to deploy the message queue requested, then the message request manager 310 may simply deny the request.

In some embodiments, the messaging service manager 300 includes the message queue monitor 360 to monitor the existing message queues 336. If a message queue has become unused for over a predetermined period of time, then the message queue monitor 360 may send a notice or a signal to the message queue deployer/undeployer 340 to cause the message queue deployer 340 to undeploy the unused message queue.

Details of some embodiments of a method to automatically deploy message queues on-demand and a method to automatically undeploy message queues have been discussed above with reference to FIGS. 1 and 2, respectively.

Figure 3B:
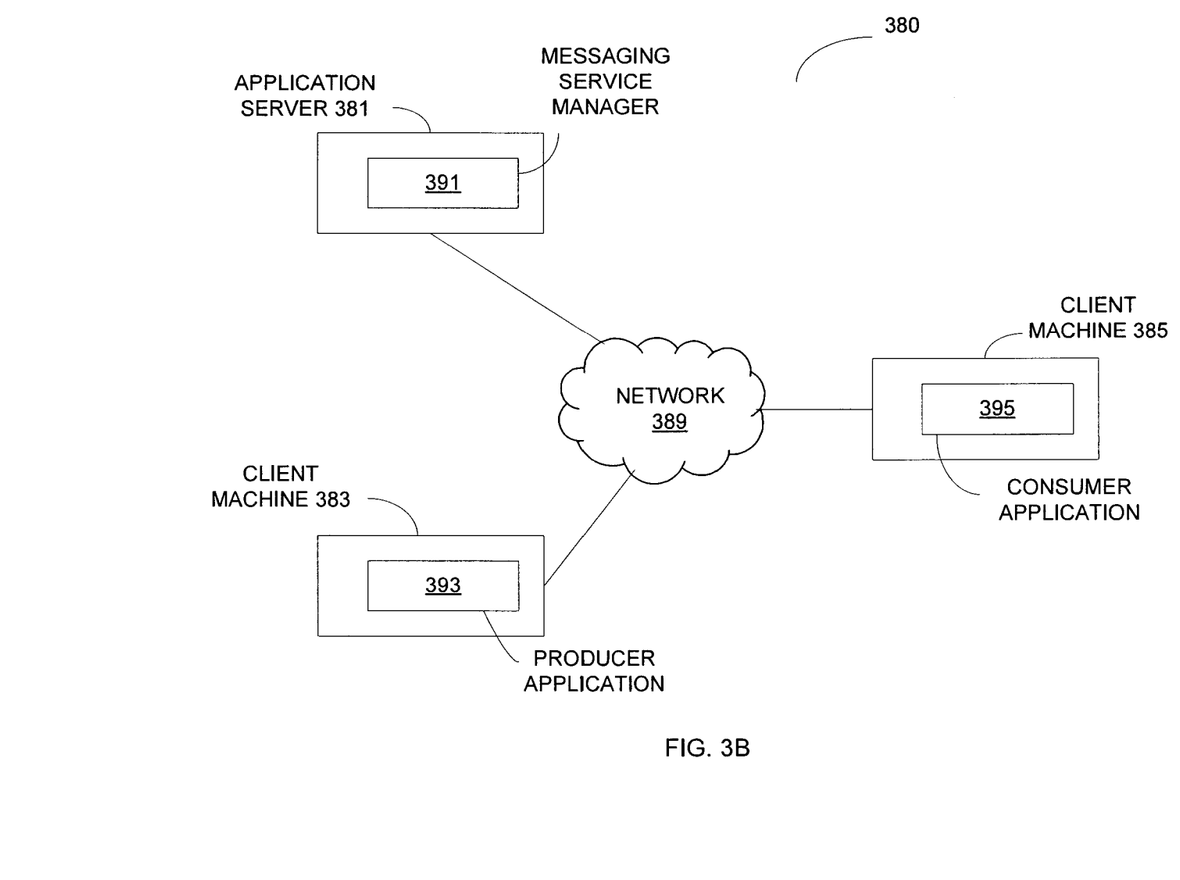
FIG. 3B illustrates one embodiment of a distributed computing system.

FIG. 3B illustrates one embodiment of a distributed computing system. The system 380 includes an application server 381, a client machine 383, a client machine 385, and a network 389. The application server 381, the client machine 383, and the client machine 385 are communicably coupled to each other via the network 389. In some embodiments, the network 389 includes one or more of a local area network (LAN), a wide area network (WAN), an Ethernet, etc. The network 389 may be wirelined, wireless, or a combination of both. Note that in different embodiments, the system 380 may include additional components not shown in FIG. 3B.

In some embodiments, a messaging service manager 391, such as the messaging service manager 300 illustrated in FIG. 3A, resides on the application server 381. The application server 381 may be implemented using a computing machine, such as the exemplary computing system shown in FIG. 4.

Figure 4:
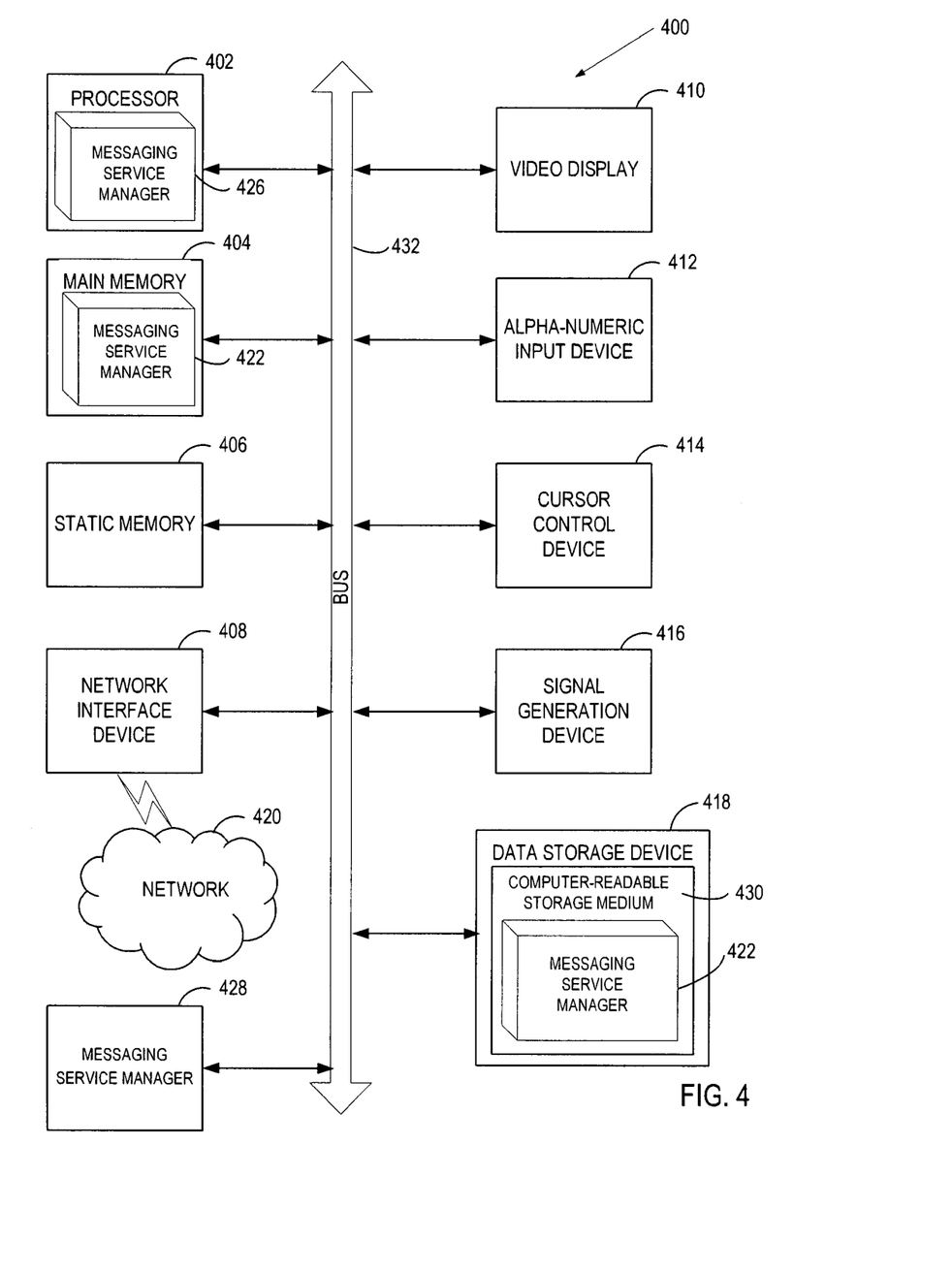
FIG. 4 illustrates a block diagram of an exemplary computer system.

In some embodiments, a producer application 393 and a consumer application 395 reside on the client machines 383 and 385, respectively. In one example, the producer application 393 sends a message to the consumer application 395. The client machines 383 and 385 may be implemented using a computing machine, such as a server, a personal computer, a laptop computer, a tablet computer, a personal digital assistant (PDA), a smart phone, etc. One exemplary embodiment of a computing machine is shown in FIG. 4. In an alternate embodiment, the producer application 393 and the consumer application 395 may reside on the same client machine. In another alternate embodiment, the messaging service manager 391, the producer application 393 and the consumer application 395 may reside on a single computing machine.

The messaging service manager 391 manages routing and delivery of messages between applications in the system 380, such as the producer application 393 and the consumer application 395 in FIG. 3B. In response to receiving a request to access a message queue or a message topic from an application, the messaging service manager 391 may check if the message queue requested or the message topic requested exists or not. If the message queue requested exists or the message topic requested exists, then the messaging service manager 391 may grant the request. In some embodiments, the messaging service manager 391 may further check the rules in a configuration file stored on the application server 381 to ensure no rules will be violated before granting the request. Otherwise, if the message queue requested or the message topic requested does not exist, then the messaging service manager 391 may check the rules in the configuration file to determine if the requesting application is allowed to deploy the message queue requested or the message topic requested. If so, then the messaging service manager 391 may deploy the message queue requested or the message topic requested for the requesting application, which is then granted permission to access the newly deployed message queue. Otherwise, if the requesting application is not allowed to deploy the message queue requested or the message topic requested, then the messaging service manager 391 may simply deny the request.

In some embodiments, the messaging service manager 391 may monitor existing message queues. If a message queue has become unused for over a predetermined period of time, then the messaging service manager 391 may undeploy the unused message queue.

Details of some embodiments of a method to automatically deploy message queues on-demand and a method to automatically undeploy message queues have been discussed above with reference to FIGS. 1 and 2, respectively.

FIG. 4 illustrates a diagrammatic representation of a machine in the exemplary form of a computer system 400 within which a set of instructions, for causing the machine to perform any one or more of the methodologies discussed herein, may be executed. In alternate embodiments, the machine may be connected (e.g., networked) to other machines in a LAN, an intranet, an extranet, and/or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 400 includes a processing device 402, a main memory 404 (e.g., read-only memory (ROM), flash memory, dynamic random access memory (DRAM) such as synchronous DRAM (SDRAM), a static memory 406 (e.g., flash memory, static random access memory (SRAM), etc.), and a data storage device 418, which communicate with each other via a bus 432.

Processing device 402 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processing device implementing other instruction sets, or processing devices implementing a combination of instruction sets. Processing device 402 may also be one or more special-purpose processing devices such as an application specific integrated circuit (ASIC), a field programmable gate array (FPGA), a digital signal processor (DSP), network processor, or the like. The processing device 402 is configured to execute the messaging service manager 426 for performing the operations and steps discussed herein.

The computer system 400 may further include a network interface device 408. The computer system 400 also may include a video display unit 410 (e.g., a liquid crystal display (LCD) or a cathode ray tube (CRT)), an alphanumeric input device 412 (e.g., a keyboard), a cursor control device 414 (e.g., a mouse), and a signal generation device 416 (e.g., a speaker).

The data storage device 418 may include a computer-accessible storage medium 430 (also known as a computer-readable storage medium) on which is stored one or more sets of instructions (e.g., messaging service manager 422) embodying any one or more of the methodologies or functions described herein. The messaging service manager 422 may also reside, completely or at least partially, within the main memory 404 and/or within the processing device 402 during execution thereof by the computer system 400, the main memory 404 and the processing device 402 also constituting computer-accessible storage media. The messaging service manager 422 may further be transmitted or received over a network 420 via the network interface device 408.

While the computer-readable storage medium 430 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical and magnetic media, etc.

The messaging service manager 428, components and other features described herein (for example, in relation to FIGS. 1 and 2) can be implemented as discrete hardware components or integrated into the functionalities of hardware components, such as ASICS, FPGAs, DSPs, or similar devices. In addition, the messaging service manager 428 can be implemented as firmware or functional circuitries within hardware devices. Further, the messaging service manager 428 can be implemented in any combination of hardware devices and software components.

In the above description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions below are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "monitoring" or "checking" or "executing" or "determining" or "deploying" or "denying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The present invention also relates to apparatus for performing the operations herein. This apparatus may be specially constructed for the required purposes, or it may comprise a general-purpose computer selectively activated or reconfigured by a computer program stored in the computer. Such a computer program may be stored in a machine-readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required operations. The required structure for a variety of these systems will appear from the description below. In addition, the present invention is not described with reference to any particular programming language. It will be appreciated that a variety of programming languages may be used to implement the teachings of the invention as described herein.

Thus, some embodiments of a system and a method to automatically deploy message queues on-demand in a computing system have been described. It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method, comprising:
   configuring, by a processing device, an application messaging service according to a set of rules in a configuration file;
   receiving a request from an application to access a message queue;
   determining, by the processing device, that the message queue does not exist;
   in response to the determining that the message queue does not exist, creating the message queue;
   determining by the processing device, in view of the set of rules, that the application is authorized to deploy the message queue;
   in response to the determining that the application is authorized to deploy the message queue, deploying the message queue and allowing the application to access the message queue;
   receiving, by the processing device, a second request from the application, wherein the second request is to access a message topic that is not deployed, and wherein the message topic comprises information to publish messages to a plurality of subscriber applications;
   in response to the second request, checking, by the processing device, the set of rules in the configuration file; and
   deploying by the processing device, without further input from the application, the message topic in response to determining that deployment of the message topic complies with the set of rules in the configuration file.

2. The method of claim 1, further comprising:
   monitoring, by the processing device, a usage of an existing message queue; and
   in response to determining, by the processing device, that the existing message queue has been unused for an amount of time specified by the set of rules, undeploying the existing message queue.

3. The method of claim 1, further comprising:
   allowing another application to access the deployed message queue.

4. The method of claim 1, wherein the application is a producer application to send messages to the message queue.

5. The method of claim 1, wherein the application is a consumer application to read a message from the message queue.

6. An apparatus comprising:
   a storage device to store a configuration file; and
   a processing device, operatively coupled to the storage device, to:
      configure an application messaging service according to a set of rules in the configuration file,
      receive a request from an application to access a message queue;
      determine that the message queue does not exist;
      in response to the determining that the message queue does not exist, create the message queue;
      determine, in view of the set of rules, that the application is authorized to deploy the message queue;
      in response to the determining that the application is authorized to deploy the message queue, deploy the message queue and allow the application to access the message queue; and
      receive a second request from the application, wherein the second request is to access a message topic that is not deployed, and wherein the message topic comprises information to publish messages to a plurality of subscriber applications;
      check the set of rules in the configuration file in response to the second request; and
      deploy, without further input from the application, the message topic in response to determining that deployment of the message topic complies with the set of rules in the configuration file.

7. The apparatus of claim 6, wherein the processing device is further to:
   monitor a usage of an existing message queue; and
   in response to determining that the existing message queue has been unused for an amount of time specified by the set of rules, undeploy the existing message queue.

8. The apparatus of claim 6, wherein the processing device is further to allow another application to access the deployed message queue.

9. The apparatus of claim 6, wherein the application is a producer application to send messages to the message queue.

10. The apparatus of claim 6, wherein the application is a consumer application to read a message from the message queue.

11. A non-transitory computer-readable storage medium embodying instructions that, when executed by a processing device, cause the processing device to:
   configure, by the processing device, an application messaging service according to a set of rules in a configuration file;
   receive a request from an application to access a message queue;
   determine, by the processing device, that the message queue does not exist;
   determine by the processing device, in view of the set of rules, that the application is authorized to deploy the message queue;
   in response to the determining that the application is authorized to deploy the message queue, deploy the message queue and allow the application to access the message queue; and
   receive a second request from the application, wherein the second request is to access a message topic that is not deployed, and wherein the message topic comprises information to publish messages to a plurality of subscriber applications;
   check the set of rules in the configuration file in response to the second request; and deploy, without further input from the application, the message topic in response to determining that deployment of the message topic complies with the set of rules in the configuration file.

12. The non-transitory computer-readable storage medium of claim 11, wherein the processing device is further to:

monitor, by the processing device, a usage of an existing message queue; and in response to determining that the existing message queue has been unused for an amount of time specified by the set of rules, undeploy the existing message queue.

13. The non-transitory computer-readable storage medium of claim 11, wherein the processing device is further to:

allow another application to access the deployed message queue.

14. The non-transitory computer-readable storage medium of claim 11, wherein the application is a producer application to send messages to the message queue.

15. The non-transitory computer-readable storage medium of claim 11, wherein the application is a consumer application to read a message from the message queue.

* * * * *